(12) United States Patent
Goto et al.

(10) Patent No.: US 10,830,870 B2
(45) Date of Patent: Nov. 10, 2020

(54) AXIAL DISPLACEMENT JUDGMENT DEVICE

(71) Applicant: DENSO CORPORATION, Aichi-pref. (JP)

(72) Inventors: Kenji Goto, Kariya (JP); Masanobu Yukumatsu, Kariya (JP); Takamasa Ando, Kariya (JP); Nobuyuki Terada, Kariya (JP)

(73) Assignee: DENSO CORPORATION, Aichi-Pref. (JP)

( * ) Notice: Subject to any disclaimer, the term of this patent is extended or adjusted under 35 U.S.C. 154(b) by 820 days.

(21) Appl. No.: 15/100,955

(22) PCT Filed: Nov. 13, 2014

(86) PCT No.: PCT/JP2014/080036
§ 371 (c)(1),
(2) Date: Jun. 1, 2016

(87) PCT Pub. No.: WO2015/083515
PCT Pub. Date: Jun. 11, 2015

(65) Prior Publication Data
US 2016/0291132 A1    Oct. 6, 2016

(30) Foreign Application Priority Data

Dec. 2, 2013 (JP) .................................. 2013-249333

(51) Int. Cl.
| | | |
|---|---|---|
| *G01S 7/40* | (2006.01) | |
| *G01S 13/86* | (2006.01) | |
| *G01S 13/931* | (2020.01) | |

(52) U.S. Cl.
CPC ............ *G01S 7/4026* (2013.01); *G01S 13/86* (2013.01); *G01S 13/931* (2013.01); *G01S 2007/403* (2013.01); *G01S 2013/93271* (2020.01)

(58) Field of Classification Search
None
See application file for complete search history.

(56) References Cited

U.S. PATENT DOCUMENTS

| | | | |
|---|---|---|---|
| 2003/0034913 A1 | 2/2003 | Asanuma et al. | |
| 2005/0119036 A1* | 6/2005 | Albanna ................... | G06F 1/00 463/7 |

(Continued)

FOREIGN PATENT DOCUMENTS

| | | |
|---|---|---|
| JP | 2003-035768 A | 2/2003 |
| JP | 2004-085258 A | 3/2004 |

(Continued)

*Primary Examiner* — Erin F Heard
*Assistant Examiner* — Donald HB Braswell
(74) *Attorney, Agent, or Firm* — Machoff Brennan

(57) ABSTRACT

An axial displacement judgment device has a first detector acquiring a first detection value from a G sensor which detects an acceleration applied to a radar device, a second detector acquiring a second detection value from a YG sensor which detects the acceleration applied to a vehicle body, and a difference calculator calculating a detection difference value, which is a difference between the first detection value and the second detection value, every first period. The device further has an average difference value calculator calculating an average difference value as an average value of the detection difference values calculated during an acquisition period including the first periods, a deviation calculator calculating a difference standard deviation of the detection difference values calculated during the acquisition period, and a judgment section detecting occur- (Continued)

rence of an axial displacement of the radar device based on the average difference value and the difference standard deviation.

15 Claims, 10 Drawing Sheets

(56) References Cited

U.S. PATENT DOCUMENTS

| | | | | |
|---|---|---|---|---|
| 2012/0221276 A1* | 8/2012 | Schmidt | ............... | G01C 21/165 |
| | | | | 702/104 |
| 2012/0235851 A1 | 9/2012 | Park et al. | | |
| 2013/0154870 A1* | 6/2013 | Mills | .................... | G01S 13/931 |
| | | | | 342/70 |
| 2013/0158940 A1* | 6/2013 | Crane, III | ............... | G06F 17/00 |
| | | | | 702/141 |

FOREIGN PATENT DOCUMENTS

| | | | |
|---|---|---|---|
| JP | 2006-047140 A | 2/2006 |
| JP | 2006-064628 A | 3/2006 |
| JP | 2006-240453 A | 9/2006 |
| JP | 2008-261887 A | 10/2008 |
| JP | 2009-210485 A | 9/2009 |
| JP | 2010-127743 A | 6/2010 |
| JP | 2010-243219 A | 10/2010 |
| JP | 2012-098117 A | 5/2012 |

\* cited by examiner

YG SENSOR (ARRANGED ON VEHICLE BODY)

G SENSOR (ARRANGED ON RADAR DEVICE)

YG SENSOR (ARRANGED ON VEHICLE BODY)

G SENSOR (ARRANGED ON RADAR DEVICE)

AXIAL DISPLACEMENT JUDGMENT DEVICE

TECHNICAL FIELD

The present invention relates to technique regarding axial displacement judgment devices capable of detecting an axial displacement of a radar device mounted on a vehicle.

BACKGROUND ART

In order to provide improved vehicle driving safety, there have been used radar devices. Such a radar device is capable of detecting objects which are present around a vehicle. A radar device transmits radar waves. The radar device receives the radar waves reflected from the objects. It is also acceptable to use various devices generating and emit a laser beam, ultrasonic waves, and millimeter waves.

The radar device is mounted on a vehicle and arranged at a predetermined mounting location in the vehicle so that the radar device emits radar waves within a predetermined irradiation range. If a displacement of the mounting location of the radar device occurs in the vehicle by some reason, no radar waves emitted by the radar device may reach the predetermined irradiation range. This reduces the detection accuracy of the radar device and the accuracy of various controls for satisfying the required vehicle travelling safety.

In order to avoid this drawback, there has been proposed a technique for detecting an axial displacement of a radar device (see Patent document 1). The patent document 1 discloses a structure for detecting an axial displacement of the radar device in a direction which is perpendicular to a travel direction of the vehicle on the basis of detection values of an acceleration sensor mounted on the radar device and detection values of another acceleration sensor mounted to a vehicle body.

CITATION LIST

Patent Literature

[Patent document 1] Japanese patent laid open publication No. JP 2004-85258.

SUMMARY OF INVENTION

Technical Problem

However, when the vehicle travels on a rough road having a rough road surface, for example, output detection values of the acceleration sensor mounted to the radar device and another acceleration sensor mounted on the vehicle body widely vary. This causes a possible wrong judgment of the axial displacement of the radar device.

The present invention has been completed with a view to addressing the above conventional issues and has an object to provide an axial displacement judgment device capable of detecting an axial displacement caused in a radar device mounted on a vehicle with high accuracy.

Solution to Problem

In accordance with an aspect of the present invention, an exemplary embodiment provides an axial displacement judgment device capable of detecting an axial displacement of a radar device. The axial displacement judgment device has a first detection value acquiring section, a second detection value acquiring section, a difference calculation section, an average difference calculation section, a deviation calculation section and a judgment section.

A first acceleration sensor mounted on a first location of a vehicle provides a first detection value. The first detection value acquiring section acquires the first detection value which represents an acceleration applied to a radar device mounted on the vehicle.

A second acceleration sensor mounted on a second location of the vehicle, which is different from the first location of the vehicle, provides a second detection value. The second detection value acquiring section acquires the second detection value which represents an acceleration applied to a vehicle body.

The difference calculation section calculates a difference detection value between the first detection value and the second detection value every first period.

The average difference calculation section calculates an average difference value which is an average value of a plurality of the detection difference values calculated by the difference calculation section during a predetermined acquisition period. This predetermined acquisition period is a time length including a plurality of the first periods.

The deviation calculation section calculates a difference standard deviation which is a standard deviation of a plurality of the detection difference values calculated by the difference calculation section during the predetermined acquisition period.

The judgment section judges an occurrence of an axial displacement of the radar device on the basis of the average difference value and the difference standard deviation.

This structure previously described makes it possible to judge an occurrence of an axial displacement of the radar device on the basis of the average difference value and the difference standard deviation, where the average difference value represents an average value of a plurality of the detection difference values during the predetermined acquisition period, and the difference standard deviation represents a variation of a plurality of the detection difference values during the predetermined acquisition period.

Accordingly, it is possible for the axial displacement judgment device according to the present invention to detect an axial displacement of the radar device with high accuracy when compared with that of conventional radar devices which detect an axial displacement of a radar device based on a detection difference value only.

Reference numbers and characters described in brackets in claims indicate a correspondence relationship between claims and components used in exemplary embodiments which will be described later. These reference numbers and characters in the brackets do not limit the technical scope of the present invention.

DESCRIPTION OF EMBODIMENTS

A description will be given of exemplary embodiments with reference to drawings.

First Exemplary Embodiment 1-1. Structure

Figure 1:
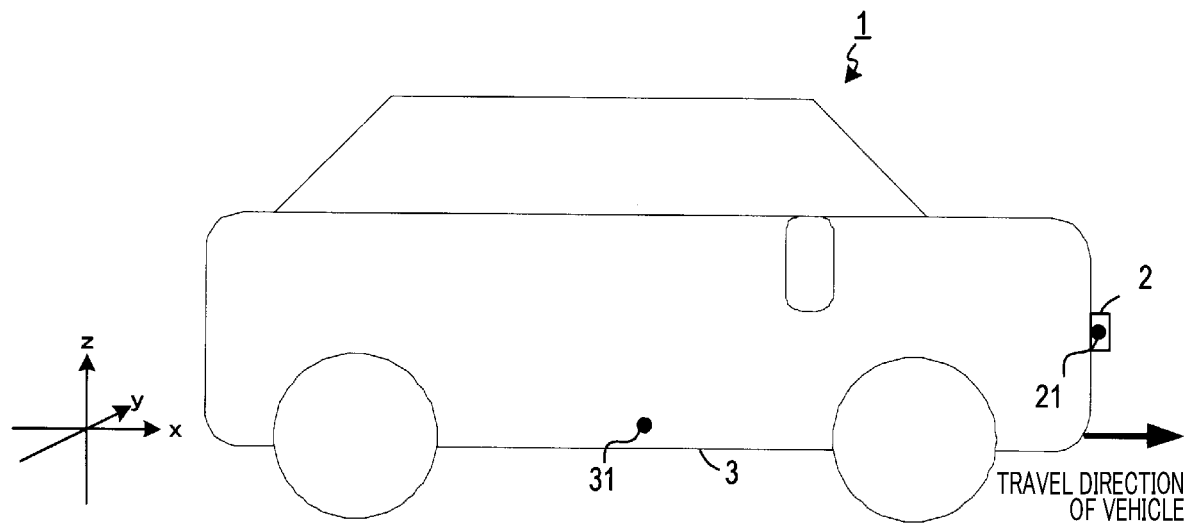
FIG. 1 is a view showing a positional relationship between a G sensor and a YG sensor mounted on a vehicle.

A radar device 2 is mounted on a front end section (a bumper at the right side) of a vehicle 1 shown in FIG. 1. The radar device 2 emits radar waves in forward direction of the vehicle 1. The radar device 2 is equipped with the axial displacement judgment device for detecting an axial displacement according to the first exemplary embodiment. The radar device 2 is mounted on the vehicle so that a central axis (radio wave axis) in a detection range of a radar sensor 20 which will be explained later is mounted at a predetermined angle to a horizontal direction (in the direction of the axis x shown in FIG. 1 as a longitudinal direction of the vehicle 1) which is a front and rear direction of the vehicle 1 and a vertical direction (in the direction of the axis z shown in FIG. 1 as the direction which is perpendicular to the direction of the axis x and a width direction of the vehicle).

Figure 2:
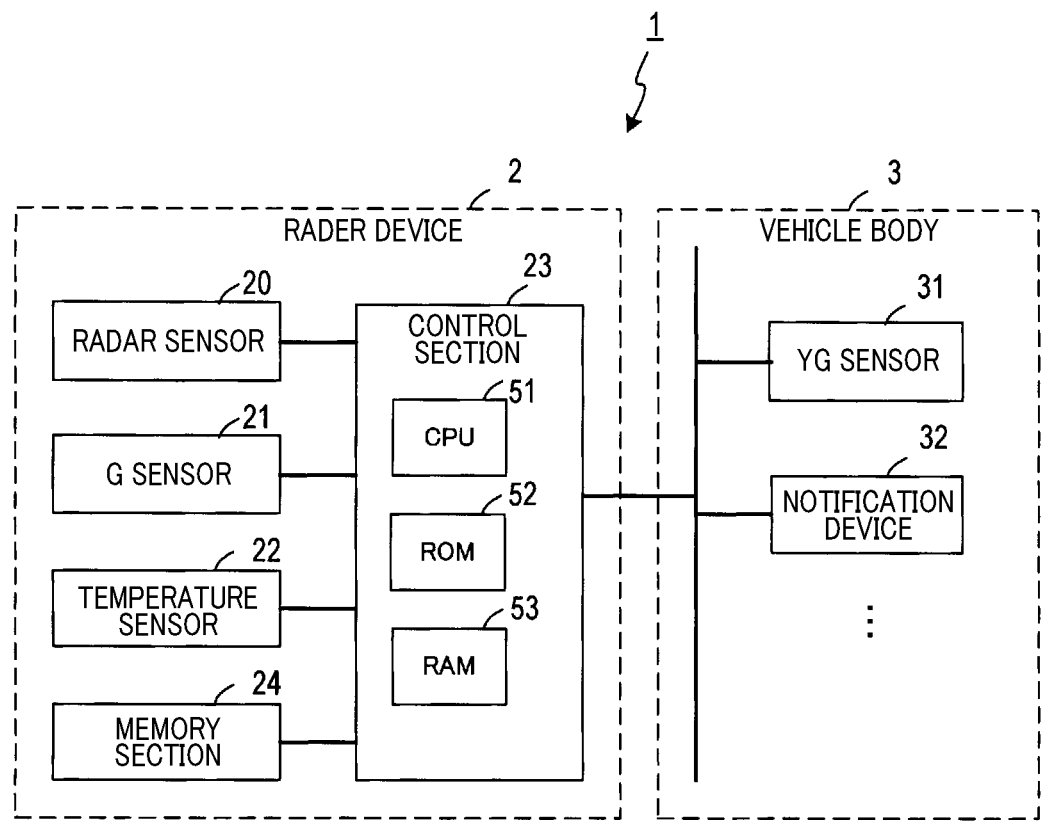
FIG. 2 is a block diagram showing an electrical connection in a radar device equipped with an axial displacement judgment device capable of judging an occurrence of an axial displacement of the radar device according to a first exemplary embodiment.

As shown in FIG. 2, the radar device 2 has a radar sensor 20, an acceleration sensor (hereinafter, G sensor) 21, a temperature sensor 22, a control section 23 and a memory section 24. The radar sensor 20 emits and receives radar waves so as to detect objects, and transmit detection data to the control section 23 so as to calculate a distance to the object from which the radar waves are reflected, and calculate a relative speed to the object.

The G sensor 21 detects an acceleration applied to a detection axis every detection period (first period) Tt, and transmits the detection results to the control section 23. In the exemplary embodiment, the G sensor 21 is housed in the casing of the radar device 2 (see FIG. 1). Accordingly, when the original direction of the radar device 2 is shifted to another direction for some reason (for example, a collision), the direction of the G sensor 21 is also tilted. That is, when the axial displacement has occurred in the radar device 2 (specifically, the axial displacement has occurred in the radio wave axis of the radar sensor 20), the detection axis of the G sensor 21 is also tilted. The G sensor 21 has at least one detection axis so as to detect a tilt of the radar device 2 (the detection axis of the G sensor 21) to the horizontal direction (the axis x) of the vehicle 1.

The temperature sensor 22 detects a temperature of the radar device 2, and outputs a detection result to the control section 23. In the present exemplary embodiment, the temperature sensor 22 is housed in the casing of the radar device 2. The control section 23 is composed of a microcomputer which is known. The microcomputer has a CPU 51, a ROM 52, a RAM 53, etc. The CPU 51 executes programs stored in the memory section 24 in order to perform at least an object calculation process and a judgment process. The object calculation process calculates a distance to an object which reflects radar waves, a relative speed to the object, etc. on the basis of observation data transmitted from the radar sensor 20. The judgment process judges occurrence of an axial displacement of the radar device 2.

On the other hand, the acceleration sensor (hereinafter, YG sensor) 31 as a part of a yaw rate sensor, and a notification device 32 are mounted on the vehicle 1. Similar to the G sensor 21, the YG sensor 31 (a yaw rate sensor) detects an acceleration applied to the detection axis every detection period Tt, and transmits detection results to the control section 23. In the present exemplary embodiment, the YG sensor 31 is arranged at a center bottom section of the vehicle body 3 (see FIG. 1). The YG sensor 31 is arranged so as to detect an acceleration applied to the horizontal direction (axis x) of the vehicle 1 by using the detection axis.

The notification device 32 is arranged in an instrument panel of a compartment, and provides information through a display. Specifically, the notification device 32 receives control signals transmitted from the control section 23, and provides to user (driver and vehicle occupants) information regarding a position displacement of the radar device 2 from the vehicle body 3, i.e. an occurrence of the axial displacement of the radar device 2.

1-2. Overview of Method for Judging Axial Displacement

Figure 3A:
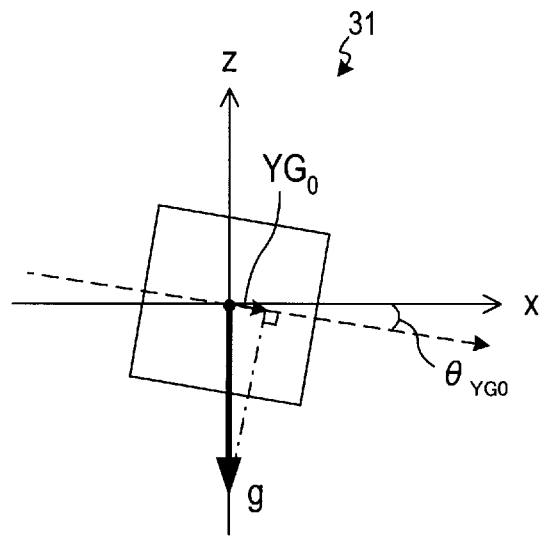
FIG. 3A is a view showing one example of a detection angle of each of the YG sensor and the G sensor in an initial mounting state (before shipment) mounted on the vehicle.
Figure 3A:
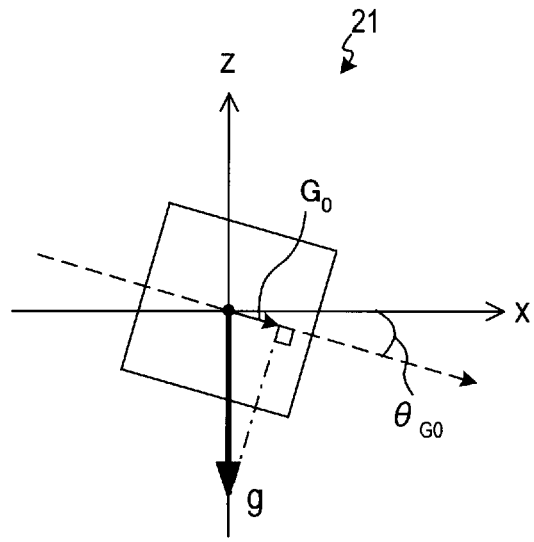

Next, a description will be given of an overview of the method for judging an axial displacement of the radar device 2 by using the G sensor 21 and the YG sensor 31. FIG. 3(a) is a view showing an example of a detection value of each of the YG sensor and the G sensor in an initial mounting state mounted on the vehicle 1 when a downward acceleration (gravitational acceleration) in a vertical direction. In the initial mounting state means that no axial displacement occurs in the radar device 2 (for example, the condition before shipment). The dotted line shown in FIG. 3(a) indicates a detection axis of the acceleration in each sensor. As shown in FIG. 3(a), the YG sensor 31 detects a detection value $YG_0$ when the gravitational acceleration g is a component projected on the detection axis. Similarly, the G sensor 21 detects a detection value $G_0$ when the gravitational acceleration g is a component projected on the detection axis.

An initial difference value $D_0$ ($D_0=G_0-YG_0$) is a difference between the detection value of the G sensor 21 and the detection value of the YG sensor 31. The initial difference value $D_0$ corresponds to a difference between a tilt $\theta_{G0}$ of the detection axis of the G sensor 21 and a tilt $\theta_{YG0}$ of the YG sensor 31 on the x axis under the condition (as the initial mounting state) shown in FIG. 3(a).

Figure 3B:
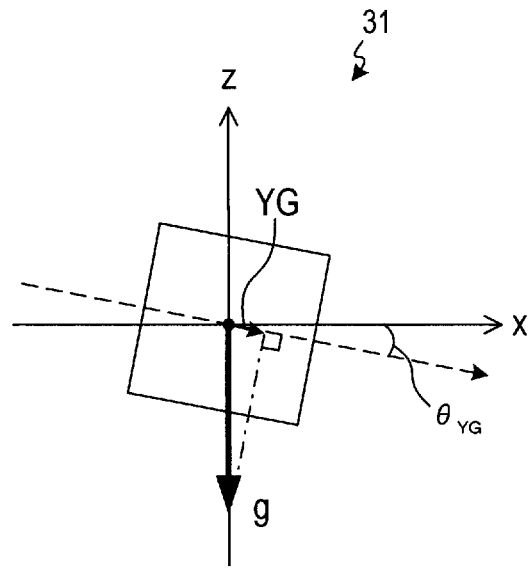
FIG. 3B is a view showing an example of a detection angle of each of the YG sensor and the G sensor after the initial mounting state (after shipment).
Figure 3B:
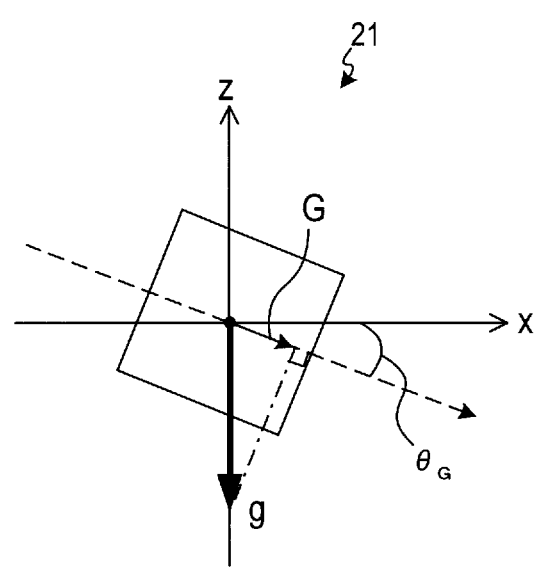

On the other hand, FIG. 3(b) is a view showing a detection value of each of the YG sensor 31 and the G sensor 21 when the gravitational acceleration g is applied to the vehicle 1 when the radar device 2 is moved from its original position by some reason (for example, a bumper crash, a dent in the bumper, etc.)

When the radar device 2 is tilted from the mounting point on the vehicle, i.e. a tilt of the radio wave axis of the radar device 2 to the axis x is deviated from a predetermined value, it is judged that the axial displacement has occurred in the radar device 2. When the axial displacement occurs in the radar device 2, the tilt of the detection axis of the G sensor 21 to the axis x is derived from the original tilt under the initial mounting state. The dotted line shown in FIG. 3(b) indicates the detection axis of the acceleration in each sensor when the axial displacement has occurred in the radar device 2. As shown in FIG. 3(b), the YG sensor 31 detects a detection value YG when the gravitational acceleration g has a component projected on the detection axis. Similarly, the G sensor 21 detects a detection value G when the gravitational acceleration g has a component projected on the detection axis.

A detection difference value D (D=G−YG) between the detection value of the G sensor 21 and the detection value of the YG sensor 31 corresponds to a difference between the tilt $\theta_G$ to the axis x of the detection axis of the G sensor 21 and the tilt $\theta_{YG}$ to the axis x of the detection axis of the YG sensor 31 shown in FIG. 3(b).

Accordingly, it is possible to detect the occurrence of an axial displacement of the radar device 2 from its original position in the initial mounting state (detect a tilting state of the detection axis of the G sensor 21 which is different from that in the initial mounting state) on the basis of a magnitude of the calculated difference between the detection difference value D and the initial difference value $D_0$.

However, for example, when the vehicle 1 is running on a roadway having a rough road surface, the detection values of the YG sensor 31 and the G sensor 21 greatly vary, as a result, and this generates variation of the initial difference value $D_0$ and the detection difference value D.

Figure 4:
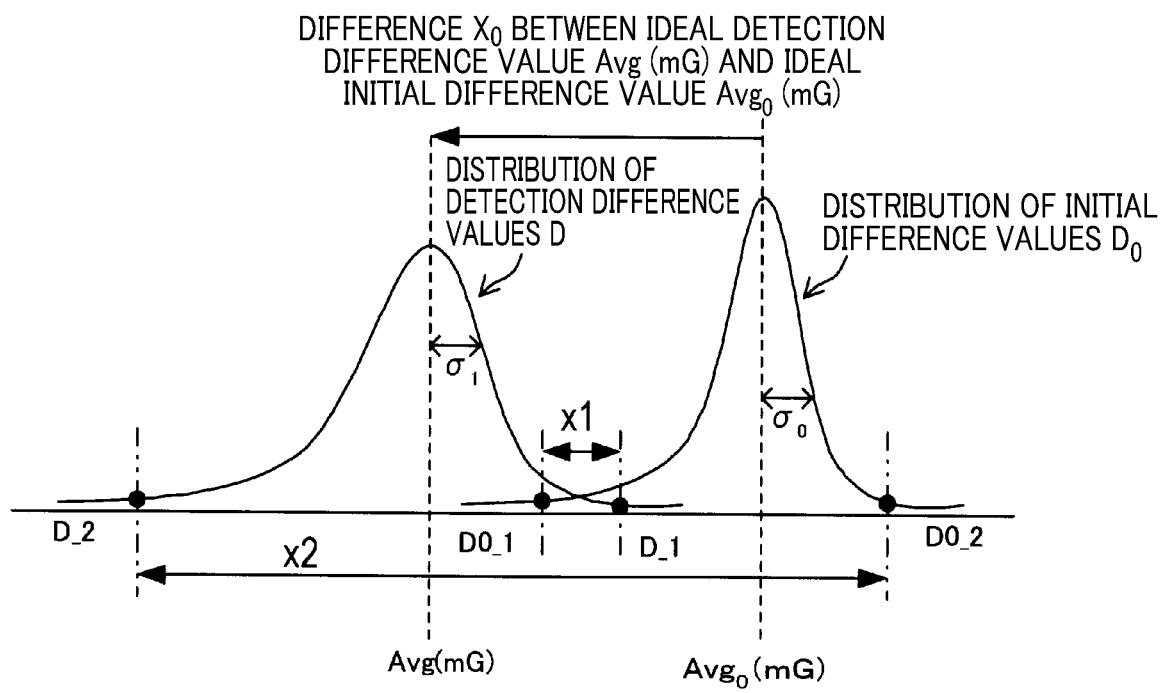
FIG. 4 is a view showing an example of a distribution of a plurality of initial difference values D0 and a distribution of a plurality of detection difference values D.

For example, as shown in FIG. 4, when a plurality of the initial difference values $D_0$ are obtained, the obtained initial difference values $D_0$ are distributed in a reference standard deviation $\sigma_0$. Similarly, when a plurality of the detection difference values D are obtained, the obtained detection difference values D are distributed in a standard deviation $\sigma_1$. Under the ideal condition in which there is no variation of the initial difference value $D_0$ and the detection difference value D, $X_0$ shown in FIG. 4 indicates a difference between an ideal detection difference value $A_{vg}$ (mG) and an ideal initial difference value $A_{vg0}$ (mG).

However, for example, when $D_0\_1$ is detected as the initial difference value, and $D\_1$ is detected as the detection difference value under the condition in which such variation occurs, there is a possible detection of a difference x1 ($x1 \ll X_0$) which is greatly smaller than the correct difference value $X_0$. In this condition, when the axial displacement has occurred in the radar device 2, there is a possible incorrect judgment in which it is judged no axial displacement occurs. In addition, for example, when $D_0\_2$ is detected as the initial difference value, and $D\_2$ is detected as the detection difference value, there is a possible detection of a difference x2 ($x2 \gg X_0$), which is greatly larger than the correct detection difference value $X_0$. In this case, when no axial displacement has occurred in the radar device 2, there is a possible incorrect judgment which judges that the axial displacement has occurred. As previously described, the simple comparison method of comparing the detection difference value D with the initial difference value $D_0$ would cause an incorrect judgment to detect an occurrence of the axial displacement of the radar device 2.

In order to avoid this problem, the axial displacement judgment device according to the present exemplary embodiment performs the axial displacement judgment process capable of judging an occurrence of the axial displacement of the radar device 2 in accordance with the variation generated in the initial difference value $D_0$ and the detection difference value D.

That is, the axial displacement judgment device according to the present exemplary embodiment acquires a predetermined number of the initial difference value $D_0$ under the state (the initial mounting state) shown in FIG. 3(a), and calculates the reference difference value $A_{vg0}$ which is an average value of these initial difference values $D_0$.

Further, under the state shown in FIG. 3(b), the axial displacement judgment device acquires a predetermined number of the initial difference values D (the number thereof is p), and calculates an average difference value $A_{vg}$ of these detection difference values D. The axial displacement judgment device evaluates a magnitude of the difference between the average difference value $A_{vg}$ and the reference difference value $A_{vg0}$. Further, the axial displacement judgment device judges occurrence of the axial displacement of the radar device 2 on the basis of the variation of the detection difference values D and the initial difference values $D_0$.

1-3. Processing

Figure 5:
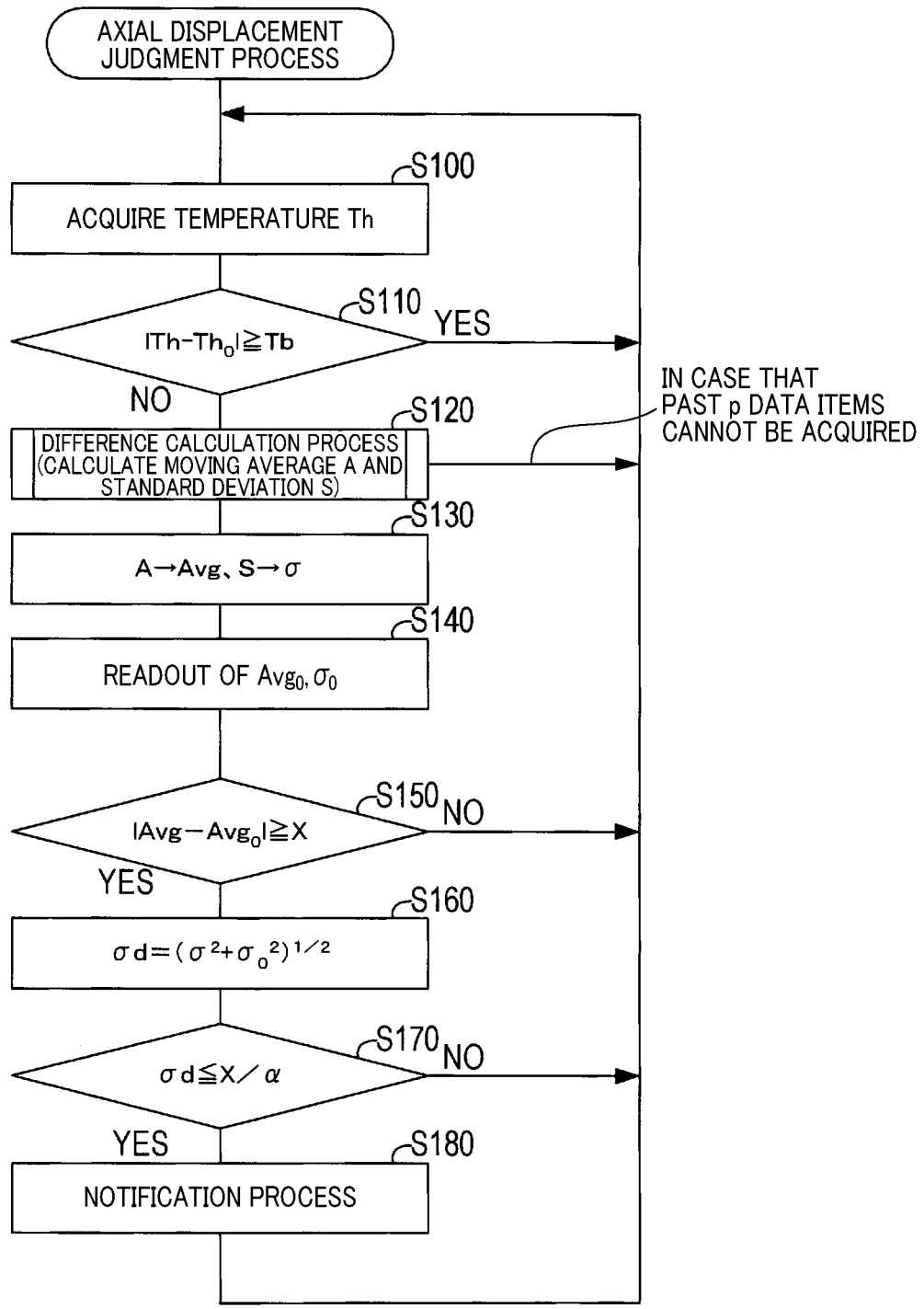
FIG. 5 is a view showing a flow chart of a judgment process for detecting an axial displacement of a radar device performed by the axial displacement judgment device for judging an occurrence of an axial displacement according to the first exemplary embodiment.

Next, a description will be given of the axial displacement judgment process performed by the control section 23 of the axial displacement judgment device according to the present exemplary embodiment with reference to the flow chart shown in FIG. 5. The control section 23 performs the process shown in FIG. 5 during the operation of the engine of the vehicle.

In step S100 (reference character S indicates a step), the control section acquires a temperature Th of the radar device 2 detected during the current acquisition period Ts by the detection sensor 22. In step S110, the control section calculates a difference (an absolute value of the difference) between the temperature Th of the radar device 2 during the current acquisition period Ts and a temperature $Th_0$ of the radar device 2 in the initial mounting state (when the reference difference value $A_{vg0}$ was calculated). The control section judges whether or not the difference between the temperature Th and the temperature $Th_0$ is not less than a temperature threshold value Tb.

The temperature $Th_0$ of the radar device 2 under the initial mounting state has been stored in the memory section 24. When a difference between the temperature Th and the temperature $Th_0$ is not less than the temperature threshold value Tb, the operation flow returns to step S100. That is, when the temperature of the radar device 2 is greatly deviated from the temperature at the initial mounting state, because it can be considered that the detection values of the G sensor 21 and the YG sensor 31 have a low reliability, the control section does not perform the following steps. On the other hand, when the difference between the temperature Th and the temperature Th₀ is less than the temperature threshold value Tb, the operation flow proceeds to step S120.

In step S120, the control section executes a difference calculation process which will be described later. The difference calculation process calculates a moving average A, and a standard deviation S of the detection difference values D.

A description will now be given of the explanation of the moving average with reference to FIG. 6. Here, the detection difference value D will be simply referred as data.

Figure 6:
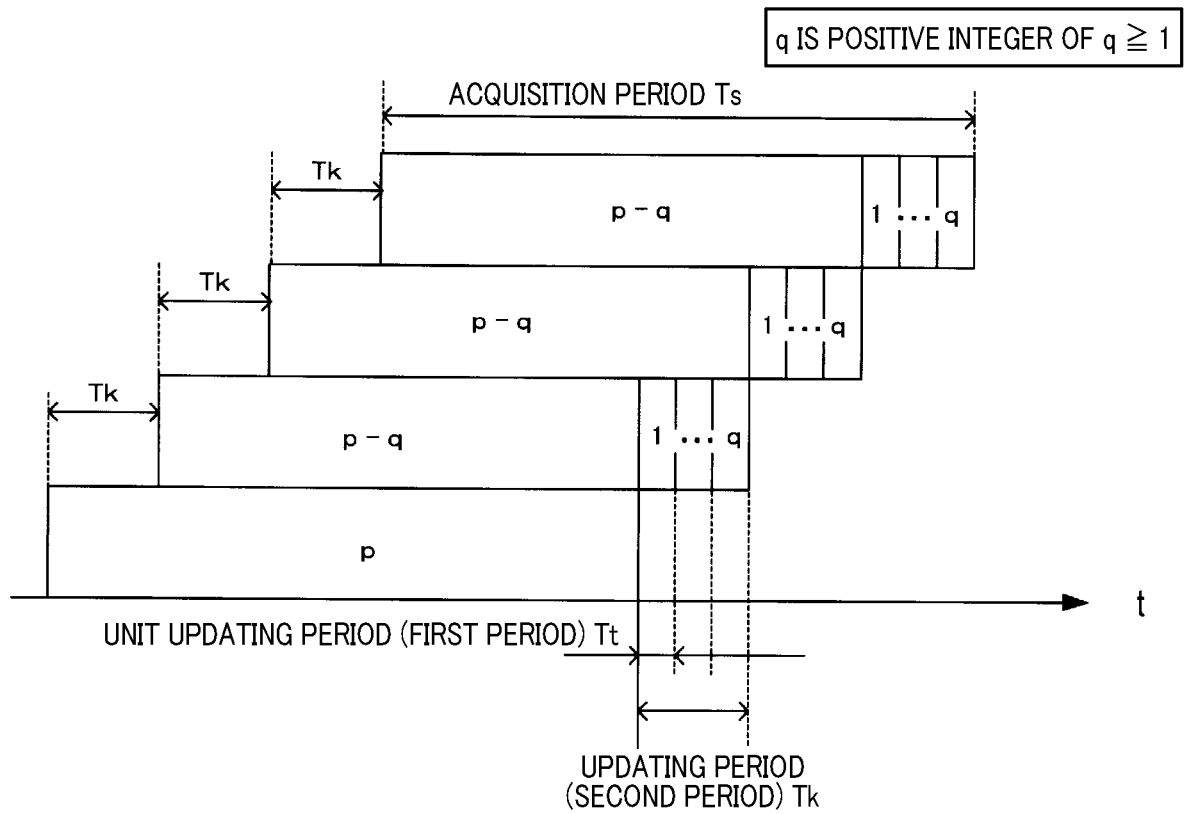
FIG. 6 is a view showing a method of calculating a moving average of the detection difference values D.

As shown in FIG. 6, a data item transmitted from each of the G sensor 21 and the YG sensor 31 is acquired every detection period Tt. The acquisition period Ts (Ts=Tt×p) indicates a period for acquiring the predetermined number p (p in a positive integer p>=2) of data items. Further, a predetermined updating period (second period) Tk (Tk=Tt×q) which is longer than the detection period Tt and shorter than the acquisition period Ts. During the updating period Tk, the predetermined number q (q is a positive integer, q>=1) of data items are acquired.

As shown in FIG. 6, the moving average is a known calculation to obtain an average value of p data items (p items) acquired during the acquisition period Ts, where the acquisition period Ts has been determined every updating period Tk.

Figure 7:
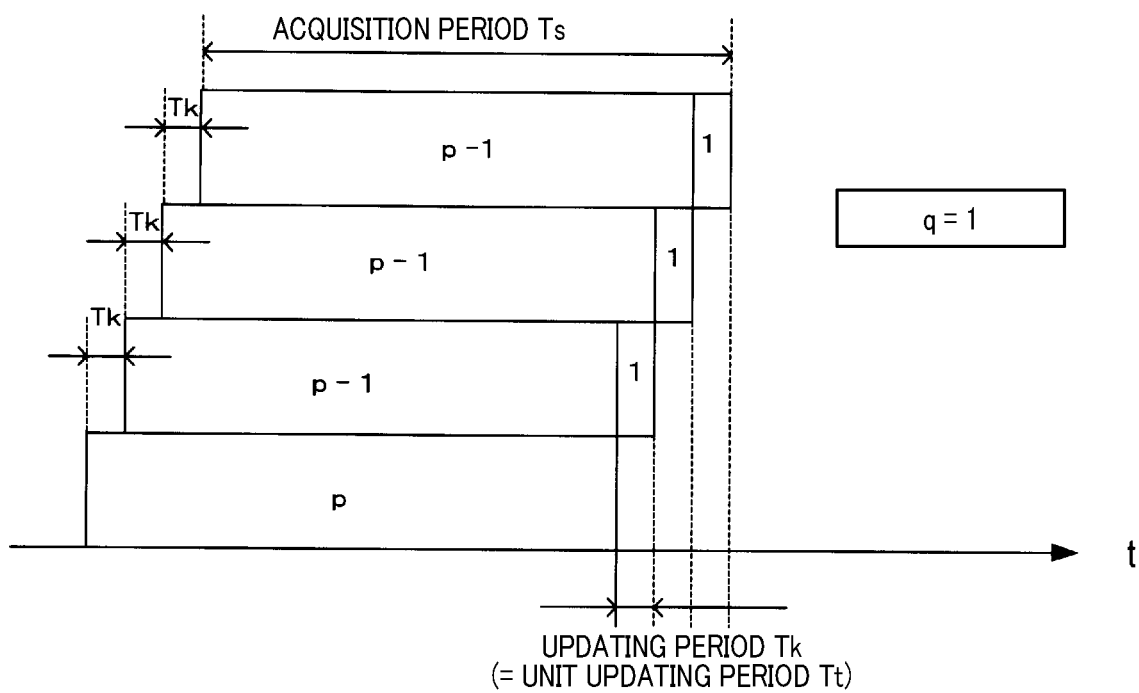
FIG. 7 is a view showing a method of calculating a moving average of the detection difference values D when an updating period is equal to the detection period (q=1).

The present exemplary embodiment uses the data acquiring number q shown in FIG. 7. That is, the detection period Tt becomes equal to the updating period Tk, and data items are acquired every detection period Tt and stored in the memory section 24. When the memory section 24 has stored the most recent p data items, the control section calculates an average value of the most recent p data items stored in the memory section 24. After this, the acquisition period Ts is delayed by a necessary period (updating period Tk) to acquire one data item (q=1), and an average value of the following p data items is calculated. These calculation are repeated. Here, the average value of the acquired data items every acquisition period Ts is called the moving average A. Further, a standard deviation of p data items acquired during the acquisition period Ts is called as the standard deviation S.

The axial displacement judgment device according to the present exemplary embodiment performs the difference calculation process in step S120 every updating period Tk.

In step S130, the moving average A calculated in step S120 is used as the average difference value $A_{VG}$, and the standard deviation S is used as the difference standard deviation σ.

In step S140, the memory section 24 has stored the reference difference value $A_{vg0}$ and the reference standard deviation $σ_0$. The reference difference value $A_{vg0}$ and the reference standard deviation $σ_0$ are read out from the memory section 24.

In step S150, the control section calculates a difference between the average difference value $A_{vg}$ and the reference difference value $A_{vg0}$. Further, the control section judges whether or not the calculated difference is not less than the difference threshold value X. When the calculated difference is less than the difference threshold value X, the control section determines that no axial displacement has occurred in the radar device 2. The operation flow proceeds to step S100.

On the other hand, when the calculated difference is not less than the difference threshold value X, the control section determines that there is a high risk of the axial displacement of the radar device 2. The operation flow proceeds to step S160.

In step S160, a square-root of the sum of squares of the difference standard deviation band the reference standard deviation $σ_0$ is calculated. This square-root of the sum of squares of them indicates a standard deviation σs which represents as a standard deviation $σ_d$ a magnitude of the variation of the detection difference value D and the initial difference value $D_0$ as shown in the equation (1).

$$σd=(σ^2+σ_0^2)^{1/2} \qquad (1)$$

In step S170, the control section judges whether or not the standard deviation $σ_d$ is not more than a deviation threshold value X/α (α=3 in the present exemplary embodiment). When the standard deviation $σ_d$ exceeds the deviation threshold value X/α, the operation flow proceeds to step S100. That is, under the state in which the standard deviation $σ_d$ exceeds the deviation threshold value X/α, i.e. there is a large variation of the detection difference values D and the initial difference values $D_0$, the detection values have a low reliability, and the control section determines that no axial displacement has occurred in the radar device.

On the other hand, when the standard deviation $σ_d$ is not more than the deviation threshold value, the detection values have high reliability, and the operation flow proceeds to step S180.

In step S180, the control section outputs a control signal to instruct the notification device 32 to notify to the user (the driver and vehicle occupants) the information regarding the occurrence of the axial displacement of the radar device 2.

Figure 8:
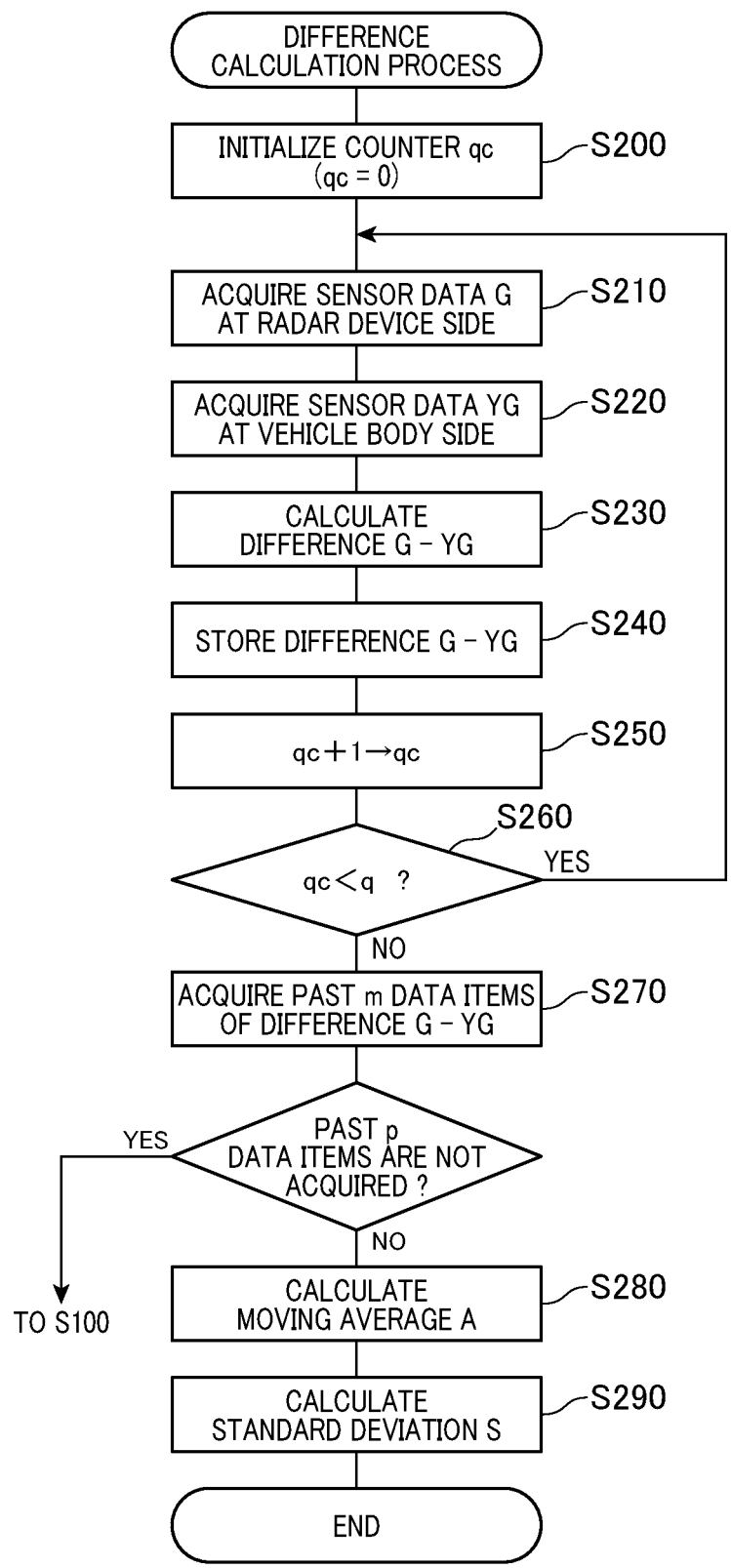
FIG. 8 is a view showing a flow chart of a difference calculation process performed by the axial displacement judgment device for judging an occurrence of an axial displacement according to the first exemplary embodiment.

Next, a description will now be given of the difference calculation process performed in step S120 in the axial displacement judgment process with reference to the flow chart shown in FIG. 8. As previously described, the difference calculation process is repeatedly executed every updating period Tk. The present exemplary embodiment uses the predetermined number q=9.

In step S200, the initialization of the counter qc is performed (qc=0).

In step S210, the control section acquires the detection value G of the G sensor 21. In step S220, the control section acquires the detection value YG of the YG sensor 31. In step S230, the control section calculates the detection difference value D. This detection difference value D is a difference between the detection value G of the G sensor 21 and the detection value YG of the YG sensor 31. In step S240, the detection difference value D calculated in the step S230 is stored in the memory section 24. The memory section 24 stores the p detection difference values D as the most recent p data items. Accordingly, the previous data items are deleted from the memory section 24.

In step S250, the data in the counter qc is incremented (qc+1→qc). In step S260, when the value of the counter qc is less than q (q=1), the operation flow returns to step S210. When the value of the counter qc is equal to q (q=1), the operation flow proceeds to step S270.

In step S270, the control section acquires the previous data items regarding the difference G−YG stored in the memory section 24. In step S280, the control section calculates the average difference value (moving average) A of the p detection difference values D.

In step S290, the control section calculates the standard deviation S of the p detection difference values D. After this, the difference calculation process is completed.

When the memory section 24 does not store the p data items regarding the difference G−GY in step S270, i.e. no p data items have been stored in the memory section 24, the difference calculation process is completed without executing the process in step S280 and step S290. The operation flow proceeds to step S100 in the axial displacement judgment process (see FIG. 5).

1-4. Effects

The axial displacement judgment device according to the first exemplary embodiment previously described provides the following effects [1A] to [1G].

[1A] In the first exemplary embodiment, the occurrence of the axial displacement caused in the radar device 2 is judged on the basis of the average difference value $A_{vg}$ of the detection difference values D obtained during the acquisition period Ts and the difference standard deviation σ which represents the variation of the detection difference values D obtained during the acquisition period Ts. Accordingly, it is possible to judge the occurrence of the axial displacement of the radar device 2 with high accuracy when compared with the structure of the axial displacement judgment using the detection difference values D only.

[1B] According to the axial displacement judgment device according to the first exemplary embodiment previously described, because it is judged that no axial displacement has occurred in the radar device 2 (S150) when the difference between the average difference value $A_{vg}$ and the reference difference value $A_{vg0}$ is less than the difference threshold value X, this makes it possible to suppress incorrect judgment of occurrence of the axial displacement based on a small variation of the average difference value caused due to detection error.

[1C] It is possible for the axial displacement judgment device according to the first exemplary embodiment previously described to judge the occurrence of the axial displacement of the radar device 2 on the basis of the variation of the detection data from the initial mounting state. Accordingly, it is possible to easily and correctly judge when the axial displacement has occurred stepwise in the radar device 2, in addition to a case when the axial displacement is rapidly caused in the radar device 2.

[1D] The axial displacement judgment device according to the first exemplary embodiment previously described judges that no axial displacement has occurred in the radar device 2 (S170) when a large variation occurs in the detection difference values D acquired during the acquisition period Ts. This makes it possible to suppress incorrect judgment to generate the axial displacement of the radar device on the basis of the low reliability detection values.

In particular, because of adding and considering the reference standard deviation $\sigma_0$ acquired in the initial mounting state, the axial displacement judgment device according to the first exemplary embodiment provides the correct judgment with high accuracy.

[1E] The axial displacement judgment device according to the first exemplary embodiment previously described judges that no axial displacement occurs in the radar device 2 when the temperature Th of the radar device 2 during the acquisition period Ts is greatly different from the temperature $Th_0$ of the radar device 2 in the initial mounting state. This makes it possible to suppress incorrect judgment to generate the axial displacement of the radar device on the basis of low reliability detection values.

[1F] It is possible for the axial displacement judgment device according to the first exemplary embodiment previously described to provide correct information regarding the occurrence of the axial displacement of the radar device 2 to the driver and vehicle occupants of the vehicle 1 when the control section judges that the axial displacement has occurred in the radar device 2.

[1G] The axial displacement judgment device according to the first exemplary embodiment previously described uses the deviation threshold value X/α corresponding to the standard deviation ad in step S170 as the variable value which varies due to the difference between the average difference value $A_{vg}$ and the reference difference value $A_{vg0}$, i.e. due to the difference threshold value X corresponding to the angle difference of the radar device 2 varied from the initial mounting state. That is, the axial displacement judgment process is performed under the condition when the variation is more small.

In the first exemplary embodiment, the control section 23 corresponds to the axial displacement judgment device, the G sensor 21 corresponds to the first acceleration sensor, and the YG sensor 31 corresponds to the second acceleration sensor.

2. Second Exemplary Embodiment 2-1. Difference to First Exemplary Embodiment

Because the axial displacement judgment device according to the second exemplary embodiment has a structure which is basically equal to the structure of the axial displacement judgment device according to the first exemplary embodiment, the same components between them are omitted here, and differences between them will be explained.

The axial displacement judgment device according to the first exemplary embodiment previously described has the structure which does not execute the judgment for detecting the occurrence of the axial displacement of the radar device 2 when the difference between the average difference value $A_{vg}$ and the reference difference value $A_{vg0}$ is less than the difference threshold value X. The average difference value $A_{vg}$ is an average value of a plurality of the detection difference values D (G-YG) acquired during the acquisition period Ts. The reference difference value $A_{vg0}$ is an average value of a plurality of the initial difference values $D_0$ ($G_0-YG_0$) acquired in the initial mounting state.

On the other hand, the axial displacement judgment device according to the second exemplary embodiment which is different from that of the first exemplary embodiment uses the average difference value $A_{vg}$, of the detection difference values acquired during the past acquisition period Ts instead of using the reference difference value $A_{vg0}$. Specifically, the CPU 51 in the control section 23 according to the second exemplary embodiment performs an axial displacement judgment process which is different from that of the first exemplary embodiment.

Figure 9:
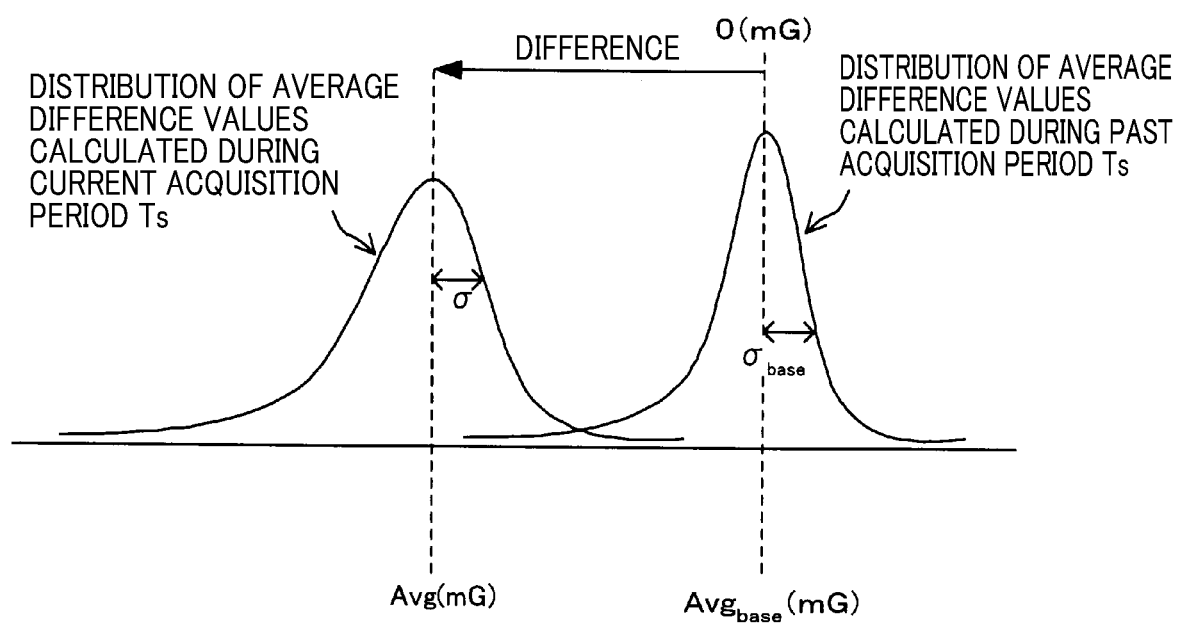
FIG. 9 is a view showing an example of the distribution of a plurality of difference values D calculated during a past acquisition period Ts and the distribution of a plurality of difference values D calculated during a current acquisition period Ts.

For example, as shown in FIG. 9, when the detection difference values D acquired during the past acquisition period Ts are distributed by the standard deviation $\sigma_{base}$ and the detection difference values D acquired during the current acquisition period Ts are distributed by the standard deviation σ. The present exemplary embodiment detects the occurrence of the axial displacement of the radar device 2 by considering the variation of the detection difference values D acquired during the past acquisition period Ts and the variation of the detection difference values D acquired during the current acquisition period Ts.

2-2. Process

Figure 10:
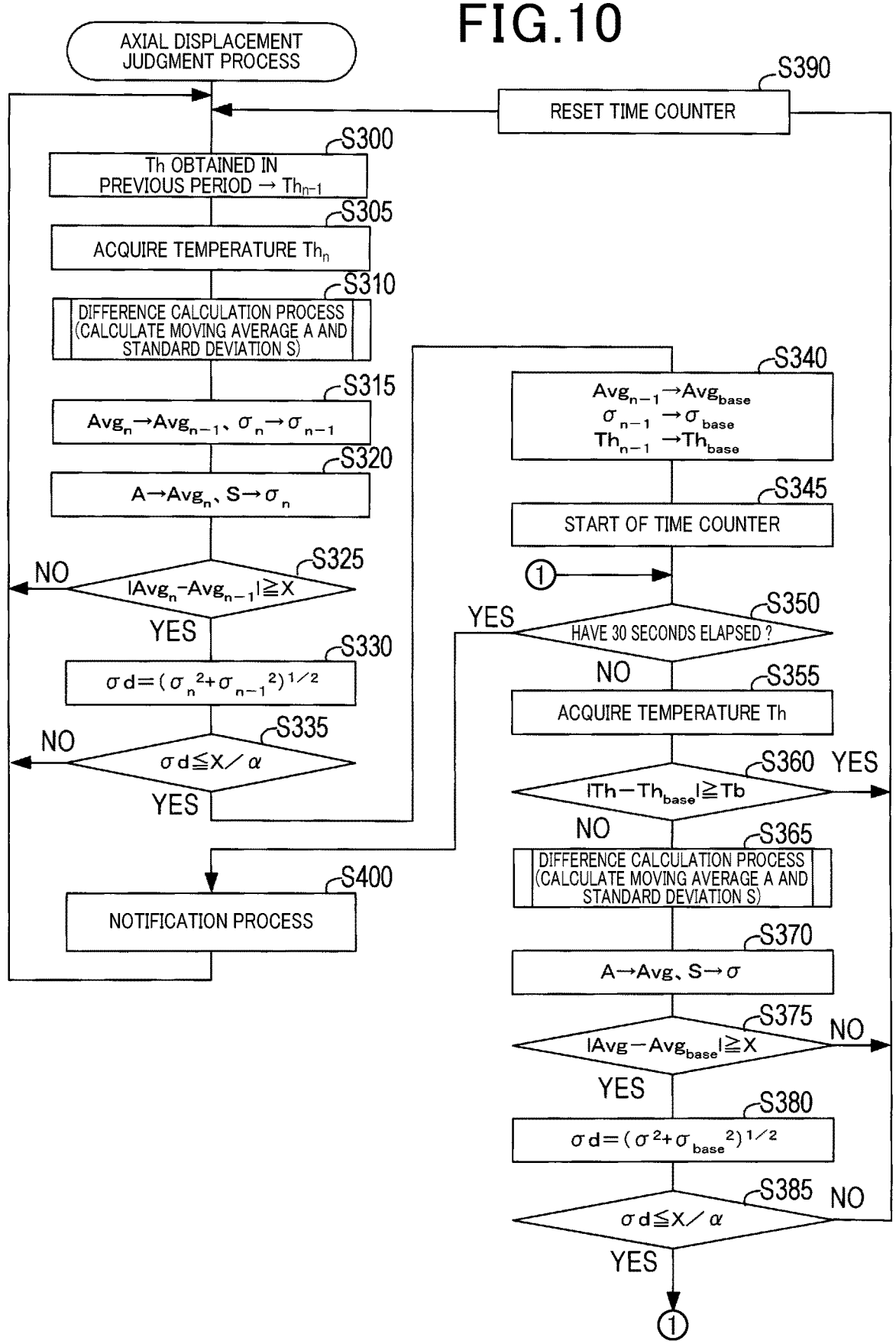
FIG. 10 is a view showing a flow chart of a judgment process for judging an occurrence of an axial displacement performed by the axial displacement judgment device according to a second exemplary embodiment.

Next, a description will be given of the axial displacement judgment process performed by the control section 23 as the axial displacement judgment device according to the second exemplary embodiment with reference to the flow chart shown in FIG. 10. This axial displacement judgment process shown in FIG. 10 is replaced with the axial displacement judgment process (see FIG. 5) performed by the axial displacement judgment device according to the first exemplary embodiment. Similar to the first exemplary embodiment, the process shown in FIG. 10 is executed during the operation of the engine.

In step S300, the temperature values Th acquired during the previous (past) acquisition period Ts−1 (hereinafter, previous acquisition period) in the past updating period Tk one period before are designated by reference characters $TH_{n-1}$, and stored in the memory section 24.

In step S305, the temperature of the radar device 2 detected by the temperature sensor 22 during the current acquisition period Ts are designated by reference character $Th_n$ and stored in the memory section 24.

Similar to the first exemplary embodiment, the difference calculation process (see FIG. 8) is executed in step S310 where the acquiring number of the data items is 1 (q=1).

In step S370, the moving average A obtained in step S365 is used as the average difference value $A_{vg}$, and the standard deviation S is used as the difference standard deviation σ.

In step S315, the value $Avg_n$ which has been stored in the memory section 24 is used as the value $Avg_{n-1}$, and the value $σ_n$ is used as the value $σ_{n-1}$.

In step S320, the moving average A calculated in step S310 during the current acquisition period Ts is used as the average difference value $Avg_n$, and the standard deviation S is used as the difference standard deviation $σ_{n-1}$.

In step S325, the control section calculates a difference between the average difference value $Avg_n$ during the current acquisition period Ts and the average difference value $Avg_{n-1}$ during the previous acquisition period $T_{s-1}$, and judges whether or not this calculated difference is not less than the difference threshold value X.

When the judgment result indicates that the difference is less than the difference threshold value X, the control section judges no axial displacement has occurred in the radar device. The operation flow proceeds to step S300.

On the other hand, when the judgment result indicates that the difference is not less than the difference threshold value X, the control section judges that the axial displacement of the radar device is highly likely to have occurred. The operation flow proceeds to step S330.

In step S330, as shown in the equation (2), the control section calculates a square-root of the sum of squares of the standard deviation σ obtained by the difference calculation process during the current acquisition period Ts and the standard deviation $σ_{n-1}$ obtained by the difference calculation process during the previous acquisition period $T_{s-1}$. This calculated square-root of the sum of squares is used as the standard deviation σd which represents the variation of the detection difference value D during the current acquisition period Ts and the detection difference value D during the previous acquisition period $T_{s-1}$.

$$σd = (σ_n^2 + σ_{n-1}^2)^{1/2} \quad (2)$$

In step S335, it is judged whether or not the standard deviation σd is not more than the deviation threshold value X/α (α=3). When the judgment result indicates that the standard deviation σd exceeds the deviation threshold value X/α, the operation flow proceeds to step S300. That is, under a condition when the standard deviation σd exceeds the deviation threshold value, i.e. there is a large variation in the detection difference values D acquired in the current acquisition period Ts and the detection difference values D acquired in the previous acquisition period $T_{s-1}$, because it can be considered that the detection values have a low reliability, the control device does not perform the axial displacement judgment process. On the other hand, when the standard deviation σd is not more than the deviation threshold value, because the detection values have high reliability, the operation flow proceeds to step S340.

In step S340, the average difference value $Avg_{n-1}$ obtained during the previous acquisition period $T_{s-1}$ is used as the reference difference value $Avg_{base}$, and the standard deviation $σ_{n-1}$ obtained during the previous acquisition period $T_{s-1}$ is used as the reference standard deviation $σ_{base}$. Further, the temperature $Th_{n-1}$ obtained during the previous acquisition period $T_{s-1}$ is used as the reference temperature $Th_{base}$.

In step S345, a time counter starts to count thirty seconds. It is acceptable to use a different time counter to count another time length instead of thirty seconds.

In step S350, the control section detects whether or not the time length of thirty seconds has elapsed.

When the detection result indicates that the counted time length of thirty seconds has elapsed, the operation flow proceeds to step S400.

In step S400, similar to the step S180 in the first exemplary embodiment, the control section executes the same notification process of the step S180 in the first exemplary embodiment. The operation flow proceeds to step S300.

On the other hand, when the detection result indicates that the counted time length does not exceed thirty seconds, the operation flow proceeds to step S355.

In step S355, the control section acquires the temperature Th of the radar device 2 detected by the temperature sensor 22 during the current acquisition period Ts.

In step S360, the control section judges whether or not a difference between the temperature Th and the reference temperature $Th_{base}$ is not less than the temperature threshold value Tb.

When the judgment result indicates that the difference between the temperature Th and the reference temperature $Th_{base}$ is not less than the temperature threshold value Tb, the operation flow proceeds to step S390. In step S390, the time counter is reset. The operation flow proceeds to step S300. That is, when the temperature of the radar device 2 is greatly deviated from the temperature obtained during the past acquisition period Ts, because it can be considered that the detection values of the G sensor 21 and the YG sensor 31 have a low reliability, the control section does not perform the following steps. On the other hand, when the difference between the temperature Th and the temperature $Th_{base}$ is less than the temperature threshold value Tb, the operation flow proceeds to step S365.

In step S365, the control section executes the difference calculation process (see FIG. 8) to update the average difference value Avg, using the moving average A obtained in step S365, and the difference standard deviation σ using the standard deviation S.

In step S375, the control section calculates a difference between the average difference value Avg and the reference difference value $Avg_{base}$, and judges whether or not this calculated difference is not less than the difference threshold value X.

When the judgment result indicates that the difference is less than the difference threshold value X, because it can be considered that no axial displacement has occurred in the radar device, the operation flow proceeds to step S390. In step S390, the time counter is reset. The operation flow proceeds to step S300.

On the other hand, when the judgment result indicates that the difference is not less than the difference threshold value X, because it can be considered that axial displacement of the radar device is highly likely to have occurred, the operation flow proceeds to step S380.

In step S380, as shown in the equation (3), the control section calculates, as the standard deviation σd, a square-root of the sum of squares of the difference standard deviation σ and the reference standard deviation $\sigma_{base}$.

$$\sigma d = (\sigma^2 + \sigma_{base}^2)^{1/2} \quad (3)$$

In step S385, the control section judges whether or not the standard deviation σd is not more than the deviation threshold value X/α (α=3). When the judgment result indicates that the standard deviation σd exceeds the deviation threshold value X/α, the operation flow proceeds to step S390. In step S390, the time counter is reset. The operation flow proceeds to step S300.

On the other hand, when the standard deviation σd is not more than the deviation threshold value, because it can be considered that the detection values have high reliability, the operation flow proceeds to step S350. The control section executes the repetition of the series of the processes of step S350 to step S385.

That is, in the axial displacement judgment process performed by the axial displacement judgment device according to the second exemplary embodiment, it is judged whether or not there is a possible axial displacement of the radar device 2 on the basis of the variation of the detection data items obtained during the current acquisition period Ts to the previous acquisition period $T_{s-1}$ (S325, S335).

When the judgment result indicates that the axial displacement of the radar device 2 is highly possible ("YES" in step S335), the control section judges whether or not there is a possible axial displacement of the radar device 2 during the following acquisition period Ts on the basis of the variation from the previous acquisition period $T_{s-1}$ (from step S355 to step S385).

When the judgment result, which indicates there is a possible occurrence of the axial displacement of the radar device 2, is continued over 30 seconds (YES in S350), the control device notifies the information regarding the occurrence of the axial displacement of the radar device 2 to the user (driver and vehicle occupants) (step S400).

As previously described in detail, the axial displacement judgment device according to the second exemplary embodiment previously described has the following effects [2A], [2B], and [2C] in addition to the effects [1A], [1B] and [1G] of the axial displacement judgment device according to the first exemplary embodiment.

[2A] The axial displacement judgment device according to the second exemplary embodiment judges the occurrence of the axial displacement of the radar device 2 on the basis of the variation to the past acquisition period Ts. Accordingly, it is possible to judge the occurrence of the axial displacement under the similar environment condition such as a temperature, etc. The control device detects and judges the occurrence of the axial displacement of the radar device 2 on the basis of the variation obtained by the most recent acquisition period Ts, for example.

[2B] Because of not judging that no axial displacement occurs in the radar device when the detection difference values acquired during the acquisition period Ts greatly vary (S335, S385), the axial displacement judgment device according to the second exemplary embodiment can suppress incorrect detection of the occurrence of axial displacement of the radar device when the detection difference values have a low reliability. In particular, because of adding the standard deviation of the detection difference values acquired during the past acquisition period $T_{s-1}$, the axial displacement judgment device according to the second exemplary embodiment provides the correct judgment with high accuracy.

[2C] Because of judging that no axial displacement has occurred in the radar device when the difference between the temperature Th of the radar device 2 acquired during the acquisition period Ts and the temperature ($TH_{base}$) of the radar device 2 acquired during the past acquisition period Ts (such as $T_{s-1}$) is large (S360), the axial displacement judgment device according to the second exemplary embodiment suppresses occurrence of incorrect detection of the occurrence of the axial displacement of the radar device when the detection difference values have a low reliability.

In the axial displacement judgment device according to the second exemplary embodiment, the processes in step S300 to S305, S315 to S360 and S370 to S400 correspond to the judgment means.

3. Other Modifications

The concept of the present invention is not limited by these exemplary embodiments according to the axial displacement judgment device of the present invention previously described. The present invention provides various modifications.

Figure 11:
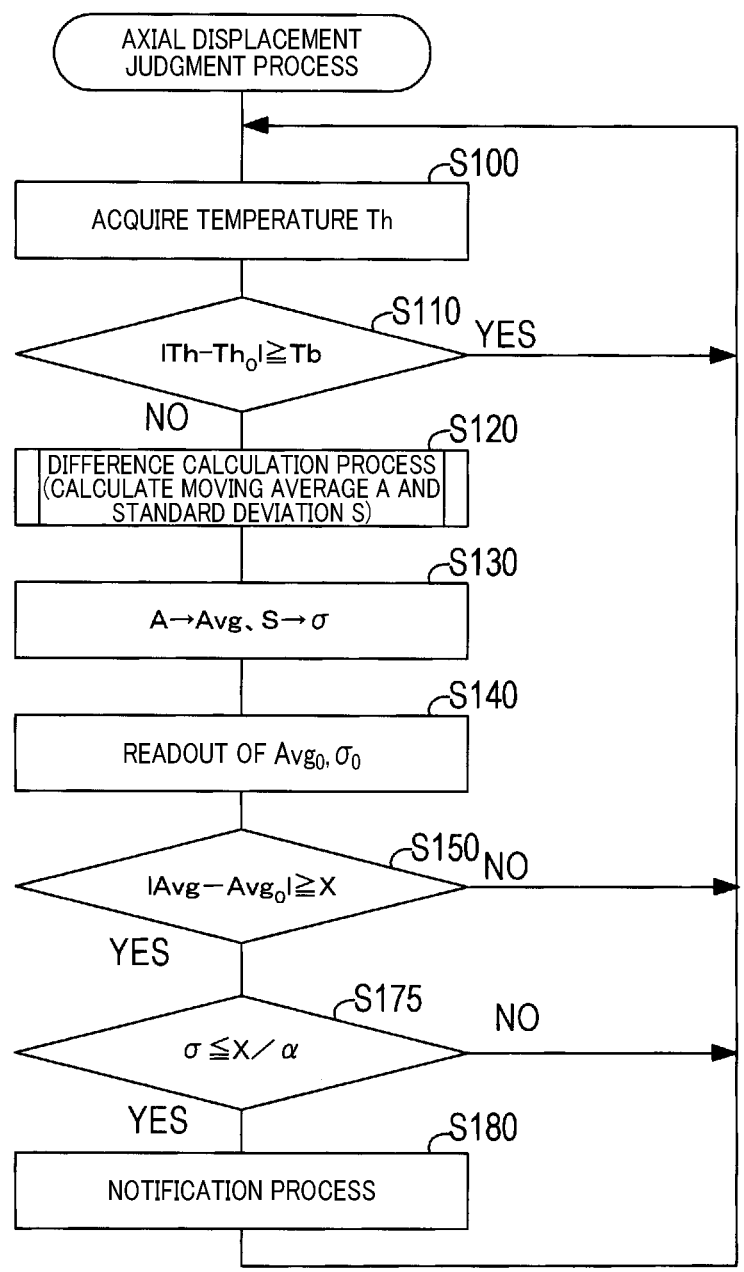
FIG. 11 is a view showing a flow chart of a judgment process for judging an occurrence of an axial displacement performed by the axial displacement judgment device according to a modification 3A of the first exemplary embodiment.

[3A] In the process in step S170 in the exemplary embodiment (the first exemplary embodiment), the control section judges that the axial displacement has occurred in the radar device when the square-root of the sum of squares of the difference standard deviation and the reference standard deviation is not more than the predetermined deviation threshold (X/α). The concept of the present invention is not limited by this. For example, it is acceptable for the axial displacement judgment device to judge the occurrence of the axial displacement of the radar device when the difference standard deviation σ calculated in step S120 is not more than the predetermined deviation threshold (X/α). In this case, as shown in FIG. 11, the process in step S160 shown in FIG. 5 can be eliminated, and the process in step S170 shown in FIG. 5 is replaced with the process in step S175 shown in FIG. 11. Similar to the exemplary embodiment previously described, this makes it possible to avoid the incorrect judgment which judges that the axial displacement has occurred when the detection difference values acquired during the acquisition period Ts greatly vary. It is accordingly possible to suppress incorrect judgment to judge the occurrence of the axial displacement of the radar device when the detection difference values have a low reliability.

In the second exemplary embodiment, it is possible to eliminate the process in step S330, and to replace the process in step S335 with $\sigma_n \leq X/\alpha$, to eliminate the process in step S380, and replace the process in step S385 with $\sigma \leq X/\alpha$. This makes it possible to avoid the incorrect judgment of occurrence of the axial displacement when the detection difference values acquired during the acquisition period Ts greatly vary. It is accordingly possible to suppress incorrect judgment to judge the occurrence of the axial displacement of the radar device when the detection difference values have a low reliability.

Figure 12:
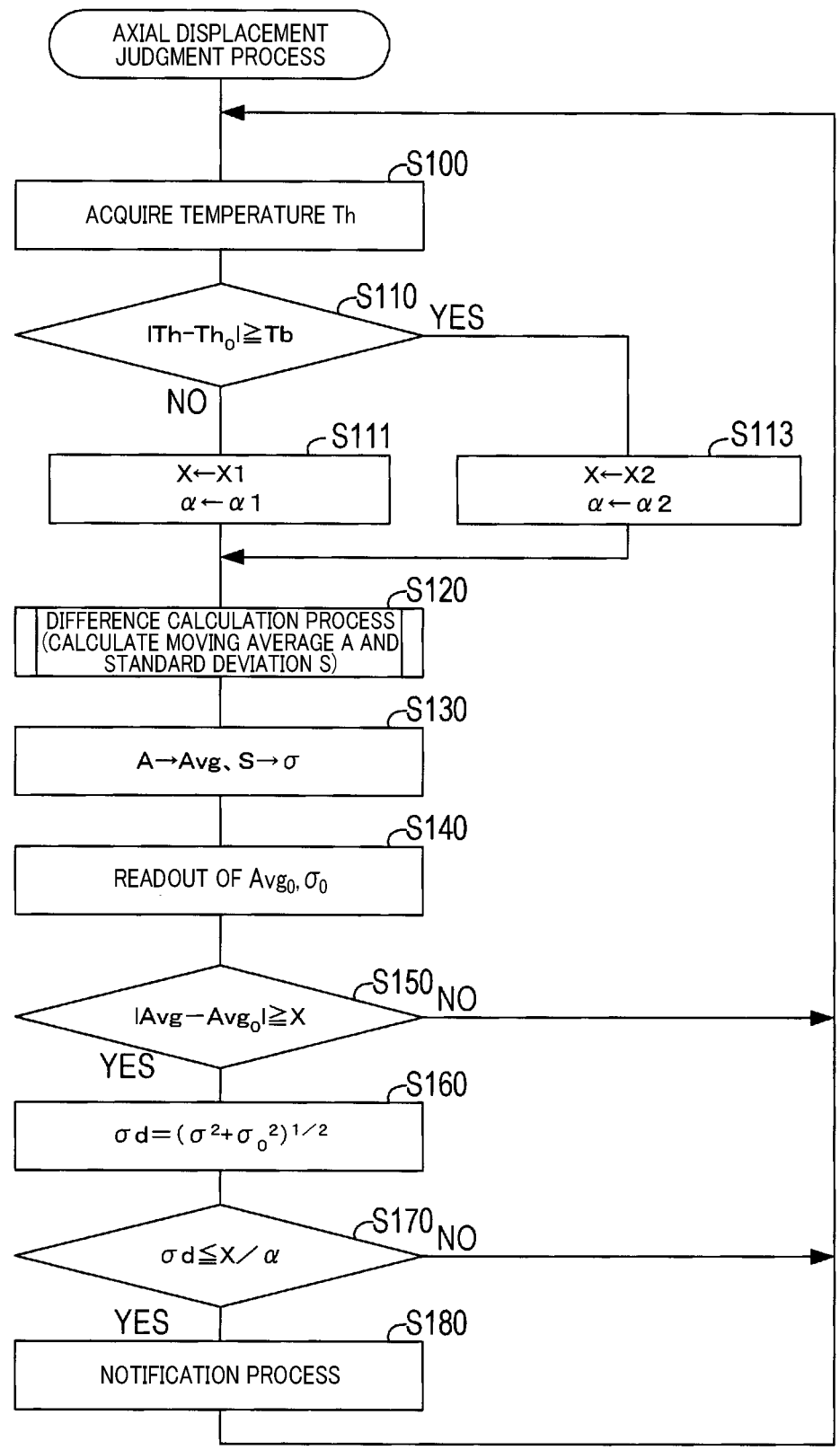
FIG. 12 is a view showing a flow chart of a judgment process for judging an occurrence of the axial displacement performed by the axial displacement judgment device according to another modification 3B of the first exemplary embodiment.

[3B] In the process in step S110 in the exemplary embodiment (the first exemplary embodiment), the control device does not judge the occurrence of the axial displacement when a difference between the temperature Th of the radar device 2 acquired during the acquisition period Ts and the temperature $Th_0$ of the radar device 2 acquired in the initial mounting state is not less than the temperature threshold value Tb. On the other hand, it is acceptable to have a structure in which the control section executes the judgment of detecting the occurrence of the axial displacement of the radar device on the basis of the difference between the temperature Th of the radar device 2 acquired during the acquisition period Ts and the temperature $Th_0$ of the radar device 2 acquired in the initial mounting state. In this case, as shown in the flow chart of the axial displacement judgment process shown in FIG. 12, the process in step S111 and the process in step S113 are added after the execution of the process in step S110 shown in FIG. 5. That is, as shown in FIG. 12, when the difference between the temperatures is less than the temperature threshold Tb (NO in step S110), the operation flow proceeds to step S111. In step S111, X1 is replaced with the difference threshold X, and the constant value α of the deviation threshold (X/α) is replaced with α.

On the other hand, when the difference between the temperature values is not less than the temperature threshold Tb (YES in step S110), the operation flow proceeds to step S113. In step S113, the difference threshold X is replaced with X2, and the constant value α of the deviation threshold (X/α) is replaced with α2. The difference threshold X2 is set to be larger than the difference threshold X1 (X1<X2), and the constant value α2 of the deviation threshold (X/α) is set to be larger than the constant value α1 (α1<α2).

That is, the more the difference between the temperature Th of the radar device 2 acquired during the acquisition period Ts and the temperature $Th_0$ of the radar device 2 acquired in the initial mounting state is large, the less likely the control section is to execute the axial displacement judgment process. As previously described, because the judgment criterion to judge the occurrence of the axial displacement of the radar device is changed according to the difference between the temperature Th of the radar device 2 acquired during the acquisition period Ts and the temperature $Th_0$ of the radar device 2 acquired in the initial mounting state, it is possible to suppress occurrence of the incorrect judgment to judge the occurrence of the axial displacement of the radar device when the detection difference values have a low reliability.

Similarly, it is acceptable for the axial displacement judgment device according to the second exemplary embodiment to have the structure in which the judgment criterion is changed based on the difference between the temperature Th of the radar device 2 acquired during the acquisition period Ts and the temperature $Th_{base}$ of the radar device 2 acquired in the past acquisition period Ts (such as $T_{s-1}$). In the flow chart shown in FIG. 10, it is acceptable to have a structure in which the process in step S113 is added when the judgment result in step S360 indicates affirmation, and the process in step S111 is added when the judgment result indicates negation. Because this structure makes it possible to change the judgment criterion to be used for judging the occurrence of the axial displacement of the radar device on the basis of the difference between the temperature of the radar device 2 acquired during the acquisition period Ts and the temperature of the radar device 2 acquired in the past acquisition period Ts (such as $T_{s-1}$), it is possible to suppress occurrence of incorrect judgment to judge the occurrence of the axial displacement of the radar device when the detection difference values have a low reliability.

[3C] The axial displacement judgment device according to the exemplary embodiment previously described uses the updating period Tk which is equal to the detection period Tt (q=1). However, the concept of the present invention is not limited by this. It is sufficient that the updating period Tk is not less than the detection period Tt and shorter than the acquisition period Ts. That is, it is sufficient to determine the acquisition period Ts every updating period Tk. That is, the current acquisition period Ts is determined so that a part of the current acquisition period Ts is overlapped with the previous acquisition period Ts (such as $T_{s-1}$) by one period every updating period Tk. For example, if the updating period Tk is determined to be longer than the detection period Tt, it is possible to increase the judgment accuracy to judge the occurrence of the axial displacement when the detection data items gradually vary.

[3D] The axial displacement judgment device according to the exemplary embodiment previously described uses, as the deviation threshold corresponding to the standard deviation σd, the variable value (X/α) which is changed on the basis of the difference between the average difference value Avg and the reference difference value $Avg_0$, i.e. the difference threshold X corresponding to the angle difference of the radar device 2 at the initial mounting state. However, the concept of the present invention is not limited by this. For example, it is acceptable for the deviation threshold X/α to have a large value according to the difference between the average difference value Avg and the reference difference value $Avg_0$. Further, it is acceptable to set the deviation threshold αd corresponding to an optional value regardless of the difference threshold X (it is possible to set α to an optional value).

[3E] The axial displacement judgment device according to the exemplary embodiment previously described performs the difference calculation process for calculating the moving average A. However, the concept of the present invention is not limited to calculate the average value. It is sufficient to calculate a value relating to the average value instead of calculating the moving average A. For example, instead of using the average value (sum/the number of data items), it is possible to calculate a median (which is the number separating the higher half of a data items from the lower half) or a mode (which is the value that appears most often in data items). It is also acceptable to calculate an average value of data items excepting the maximum value and the minimum value.

[3F] The axial displacement judgment device according to the exemplary embodiment previously described compares the temperature Th acquired during the acquisition period Ts with the reference temperature ($Th_0$ or $Th_{base}$), and executes no axial displacement judgment process when the difference is large. On the other hand, it is acceptable to execute no axial displacement judgment process when the temperature Th acquired during the acquisition period Ts is within a predetermined temperature range (for example, which includes an extremely low temperature or an extremely high temperature).

[3G] The axial displacement judgment device according to the exemplary embodiment previously described has the structure in which the G sensor 21 is housed in the casing of the radar device 2. However, the concept of the present invention is not limited by this mounting position (the first position) of the G sensor 21. It is sufficient to arrange the G sensor 21 outside of the radar device 2. In addition, the radar device 2 is mounted on the front end section (at the bumper) of the vehicle. However, the concept of the present invention is not limited by this. It is sufficient to arrange the radar device 2 at an optional front position of the vehicle or a rear side of the vehicle.

[3H] The axial displacement judgment device according to the exemplary embodiment previously described has the structure in which the YG sensor 31 is arranged at a center bottom section of the vehicle body 3. However, the concept of the present invention is not limited by this mounting position (the second position) of the YG sensor 31. It is preferable to arrange the YG sensor 31 at a location separated from the radar device 2 in the horizontal direction (the longitudinal direction) of the vehicle. In addition, in the structure of the exemplary embodiments previously described, the YG sensor 31 is arranged as the acceleration sensor which is a part of the yaw rate sensor. However, the concept of the present invention is not limited by this. It is acceptable to use an acceleration sensor such as the G sensor 21 instead of using the YG sensor 31.

[3I] The axial displacement judgment device according to the exemplary embodiment previously described detects a component of the acceleration projected on the vertical direction which is projected to the radio wave axial direction. However, the concept of the present invention is not limited by this projection direction. It is preferable to use an optional direction instead of using the radio wave direction to which the acceleration detected by the G sensor 21 and the YG sensor 31 are projected components.

The axial displacement judgment device according to the exemplary embodiments previously described uses the acceleration sensor to detect the tilt relative to a single axis such as the horizontal axis (the axis x) of the vehicle 1. However, the concept of the present invention is not limited by this. For example, it is acceptable to use an acceleration sensor capable of detecting components in two axes such as the horizontal direction (the axis x) of the vehicle 1 and the vertical direction (the axis z) of the vehicle 1. For example, it is possible to use an acceleration sensor capable of detecting components in three axes such as such as the horizontal direction (the axis x) of the vehicle 1, the vertical direction (the axis z) of the vehicle 1, and a width direction (the axis y) of the vehicle 1. This structure makes it possible to increase the detection accuracy.

[3K] It is possible to divide the functions of the axial displacement judgment device according to the exemplary embodiment previously described to a plurality of components, or combine two or more functions of the axial displacement judgment device. Further, it is also possible to replace at least a part of the functions of the axial displacement judgment device having the structure previously described with known component having the same functions. Still further, it is acceptable to eliminate a part of the functions of the axial displacement judgment device having the structure previously described if possible to solve the conventional drawbacks. Still further, it is possible to add at least a part of the components in one exemplary embodiment to the structure of another exemplary embodiment, or replace a part of these components with the component in another exemplary embodiment. The concept of the present invention includes various modifications specified by the claims.

[3L] It is possible to realize the concept of the present invention by using the control section 23, a system having the control section 23, programs to be executed by the control section 23, a computer-readable storage medium storing these programs, and the axis displacement judgment method, etc.

REFERENCE SIGNS LIST

1 Vehicle, 2 Radar device, 3 Vehicle body, 20 Radar sensor, 21 G sensor, 22 Temperature sensor, 23 Control section, 24 Memory section, 31 YG sensor, 32 Notification device, 51 CPU, 52 ROM, and 53 RAM.

The invention claimed is:

1. An axial displacement judgment device for judging an occurrence of axial displacement of a radar device mounted on a vehicle, the axial displacement judgment device comprising:
    a first detection value acquiring section configured to acquire a first detection value detected by and outputted from a first acceleration sensor arranged at a first position of the vehicle, the first detection value representing an acceleration applied to the radar device mounted on the vehicle;
    a second detection value acquiring section configured to acquire a second detection value detected by and outputted from a second acceleration sensor arranged at a second position of the vehicle which is different from the first position of the vehicle, the second detection value representing an acceleration applied to a vehicle body;
    a difference calculation section configured to calculate a detection difference value, which is a difference between the first detection value and the second detection value, every first period;
    an average difference value calculation section configured to calculate an average difference value as an average value of the detection difference values calculated by the difference calculation section during an acquisition period which is a period composed of a plurality of the first periods;
    a deviation calculation section configured to calculate a difference standard deviation as a standard deviation of a plurality of the detection difference values calculated by the difference calculation section during the acquisition period; and
    a judgment section configured to judge an occurrence of axial displacement caused in the radar device on the basis of the average difference value and the difference standard deviation.

2. The axial displacement judgment device according to claim 1, wherein the judgment section judges that axial displacement has occurred in the radar device based on a difference between the average difference value and the difference standard deviation and whether the difference is more than a predetermined difference threshold.

3. The axial displacement judgment device according to claim 2, wherein a reference difference value is an average value of differences between first detection values and second detection values acquired in an initial mounting state in which no axial displacement has occurred in the radar device.

4. The axial displacement judgment device according to claim 3, wherein the judgment section judges the occurrence of axial displacement based on a square-root of a sum of squares of the difference standard deviation and a reference standard deviation being less than a predetermined deviation threshold, wherein the reference standard deviation is a standard deviation of differences between the first detection values and the second detection values acquired by the initial mounting state.

5. The axial displacement judgment device according to claim 3, wherein the judgment section judges that axial displacement has occurred in the radar device based on the difference standard deviation being less than a predetermined deviation threshold.

6. The axial displacement judgment device according to claim 3, wherein the judgment section does not judge the occurrence of axial displacement in the radar device based on a difference between a temperature of the radar device during the acquisition period and a temperature of the radar device acquired during the initial mounting state being more than a predetermined temperature threshold.

7. The axial displacement judgment device according to claim 3, wherein the judgment section changes a judgment criterion to be used for judging the occurrence of axial displacement on the basis of a difference of a temperature of the radar device acquired during the acquisition period and a temperature of the radar device acquired in the initial mounting state.

8. The axial displacement judgment device according to claim 2, wherein a standard difference value is the average difference value calculated during a past acquisition period by the average difference calculation section.

9. The axial displacement judgment device according to claim 8, wherein the judgment section judges that axial displacement has occurred in the radar device based on a square-root of the sum of squares of the difference standard deviation and the predetermined reference standard deviation being less than a predetermined deviation threshold, wherein the reference standard deviation is the difference standard deviation calculated by the deviation calculation section during the past acquisition period.

10. The axial displacement judgment device according to claim 8, wherein the judgment section judges that axial displacement has occurred in the radar device based on the difference standard deviation being less than a predetermined deviation threshold.

11. The axial displacement judgment device according to claim 8, wherein the judgment section does not judge the occurrence of axial displacement in the radar device based on a difference between a temperature of the radar device detected during the acquisition period and a temperature of the radar device detected during a past acquisition period being more than a predetermined temperature threshold.

12. The axial displacement judgment device according to claim 8, wherein the judgment section changes a judgment criterion to be used for judging an occurrence of axial displacement according to a difference between a temperature of the radar device detected during the acquisition period and a temperature of the radar device detected during a past temperature threshold.

13. The axial displacement judgment device according to claim 1, wherein the average difference value calculation section and the deviation calculation section determine the acquisition period every detection period, wherein the detection period is equal to or longer than the first period and shorter than the acquisition period.

14. The axial displacement judgment device according to claim 1, wherein the judgment section notifies information to a driver and vehicle occupants based on judging that axial displacement has occurred.

15. A method for judging an occurrence of axial displacement of a radar device mounted on a vehicle, the method comprising:

acquiring a first detection value detected by and outputted from a first acceleration sensor arranged at a first position of the vehicle, the first detection value representing an acceleration applied to the radar device mounted on the vehicle;

acquiring a second detection value detected by and outputted from a second acceleration sensor arranged at a second position of the vehicle which is different from the first position of the vehicle, the second detection value representing an acceleration applied to a vehicle body;

calculating a detection difference value, which is a difference between the first detection value and the second detection value, every first period;

calculating an average difference value as an average value of the detection difference values calculated during an acquisition period which is a period composed of a plurality of the first periods;

calculating a difference standard deviation as a standard deviation of a plurality of the detection difference values calculated during the acquisition period; and judging an occurrence of axial displacement caused in the radar device on the basis of the average difference value and the difference standard deviation.

* * * * *